United States Patent
Kitajima

(10) Patent No.: US 10,063,826 B2
(45) Date of Patent: Aug. 28, 2018

(54) IMAGE PROCESSING APPARATUS AND IMAGE PROCESSING METHOD THEREOF

(71) Applicant: CANON KABUSHIKI KAISHA, Tokyo (JP)

(72) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/124,529

(22) PCT Filed: Jun. 8, 2015

(86) PCT No.: PCT/JP2015/067103
§ 371 (c)(1),
(2) Date: Sep. 8, 2016

(87) PCT Pub. No.: WO2015/194488
PCT Pub. Date: Dec. 23, 2015

(65) Prior Publication Data
US 2017/0019651 A1 Jan. 19, 2017

(30) Foreign Application Priority Data
Jun. 18, 2014 (JP) .................................. 2014-125755

(51) Int. Cl.
*H04N 9/77* (2006.01)
*H04N 9/07* (2006.01)
(Continued)

(52) U.S. Cl.
CPC .................. *H04N 9/77* (2013.01); *G03B 7/08* (2013.01); *G06T 5/002* (2013.01); *G06T 5/008* (2013.01);
(Continued)

(58) Field of Classification Search
CPC .......... H04N 9/77; H04N 9/735; H04N 5/008; H04N 5/002; G06T 5/002; G06T 2207/10024; G03B 7/08; G03B 7/28
(Continued)

(56) References Cited

U.S. PATENT DOCUMENTS 7,379,618 B2 * 5/2008 Motomura .............. G06T 15/50
345/606
8,310,726 B2 * 11/2012 Enjuji ..................... G06T 5/009
358/3.01
(Continued)

FOREIGN PATENT DOCUMENTS

JP  2004-021388 A  1/2004
JP  2005-010900 A  1/2005
(Continued)

OTHER PUBLICATIONS

International Search Report and Written Opinion in PCT/JP2015/067103, dated Jun. 8, 2015.
(Continued)

*Primary Examiner* — Pritham Prabhakher
(74) *Attorney, Agent, or Firm* — Fitzpatrick, Cella, Harper & Scinto

(57) ABSTRACT

Disclosed is an image processing apparatus and a control method thereof that can correct the brightness of a pixel in an image. Reflection characteristics of environment light when the image is captured are estimated by applying smoothing to the image. The brightness of the pixel is corrected by computing a correction value for correcting the brightness of the pixel based on the reflection characteristics of the environment light and adding the correction value to the pixel. The brightness can be corrected while suppressing an amplification of noise and a loss of details of a subject.

18 Claims, 9 Drawing Sheets

(51) Int. Cl.
*H04N 9/73* (2006.01)
*G03B 7/08* (2014.01)
*G03B 7/28* (2006.01)
*G06T 5/00* (2006.01)

(52) U.S. Cl.
CPC .............. *H04N 9/07* (2013.01); *H04N 9/735* (2013.01); *G03B 7/28* (2013.01); *G06T 2207/10024* (2013.01)

(58) Field of Classification Search
USPC ......................................................... 348/254
See application file for complete search history.

(56) References Cited

U.S. PATENT DOCUMENTS

| | | | | |
|---|---|---|---|---|
| 8,830,348 B2* | 9/2014 | Nomura | ................. | H04N 9/735 348/223.1 |
| 8,855,371 B2* | 10/2014 | Tsukada | ................. | H04N 1/62 345/426 |
| 8,861,843 B2 | 10/2014 | Kitajima | | |
| 8,964,089 B2* | 2/2015 | Imai | ................. | G06T 5/50 348/220.1 |
| 2005/0206928 A1 | 9/2005 | Itagaki | ................ | H04N 1/40006 358/1.9 |
| 2006/0239584 A1* | 10/2006 | Motomura | ............... | G06T 15/50 382/274 |
| 2008/0181494 A1* | 7/2008 | Watanabe | ................ | H04N 1/60 382/167 |
| 2009/0059079 A1* | 3/2009 | Enjuji | ................. | H04N 1/62 348/649 |
| 2009/0141976 A1* | 6/2009 | Tsukada | .................. | G01J 3/46 382/167 |
| 2010/0027072 A1* | 2/2010 | Enjuji | ................... | G06T 5/009 358/3.01 |
| 2013/0083969 A1* | 4/2013 | Tsukada | .................. | H04N 1/62 382/103 |
| 2013/0222236 A1* | 8/2013 | Gardenfors | ........... | G06F 1/1626 345/156 |
| 2013/0300894 A1* | 11/2013 | Imai | ......................... | G06T 5/50 348/229.1 |
| 2013/0343646 A1* | 12/2013 | Hata | .................... | G06K 9/4652 382/165 |
| 2014/0275948 A1* | 9/2014 | Kamisoyama | ....... | A61B 5/6898 600/407 |
| 2015/0178550 A1 | 6/2015 | Hirashima et al. | | |

FOREIGN PATENT DOCUMENTS

| | | |
|---|---|---|
| JP | 2010-135996 A | 6/2010 |
| JP | 2013-235537 A | 11/2013 |
| WO | 2014/102878 A1 | 7/2014 |

OTHER PUBLICATIONS

Feb. 6, 2018 European Search Report in European Patent Appln. No. 15809773.3.

Duan-sheng Chen, et al., "A Novel Approach to Detect and Correct Highlighted Face Region in Color Image," Proceedings of the IEEE Conference on Advanced Video and Signal Based Surveillance, Jul. 2003, pp. 7-12.

Xiaowu Chen, et al., "Face Illumination Manipulation Using a Single Reference Image by Adaptive Layer Decomposition," IEEE Transactions on Image Processing, vol. 22, No. 11, Nov. 2013, pp. 4249-4259.

* cited by examiner

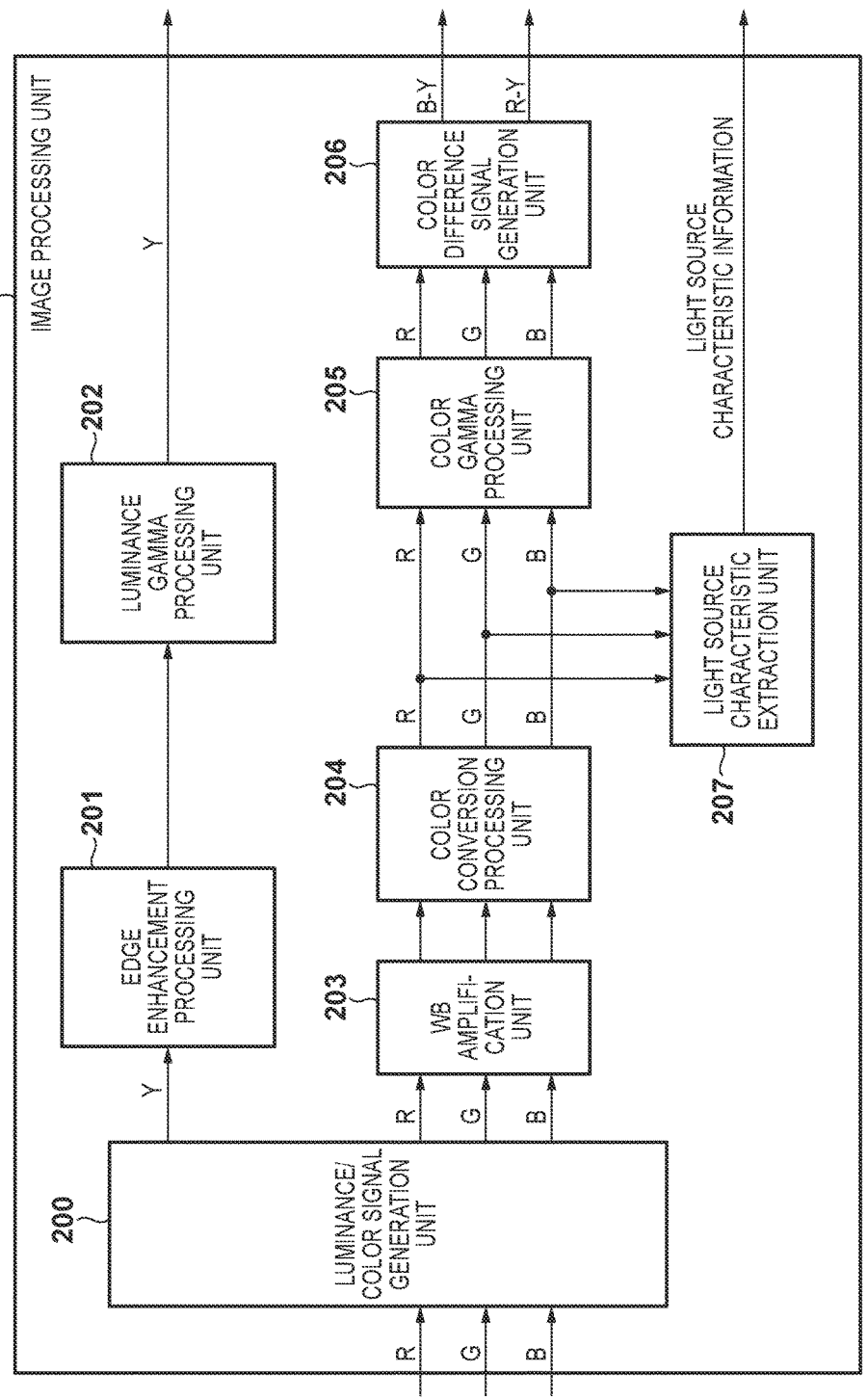

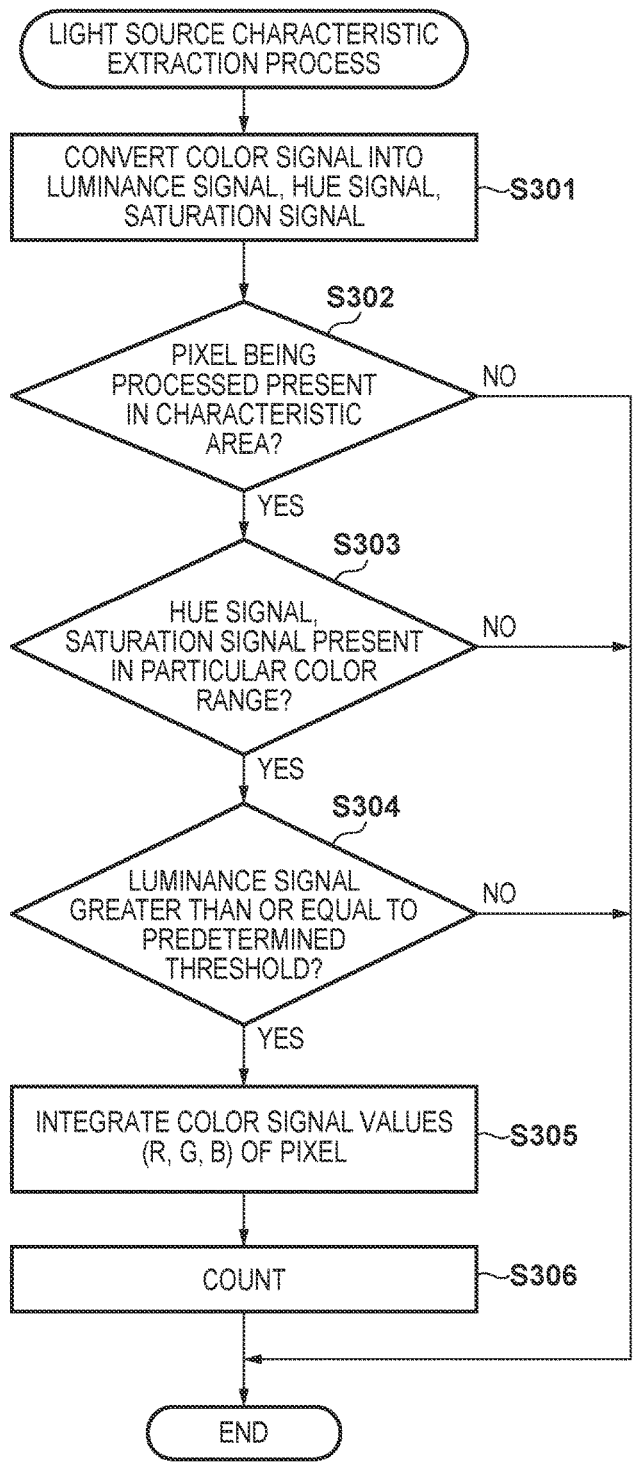

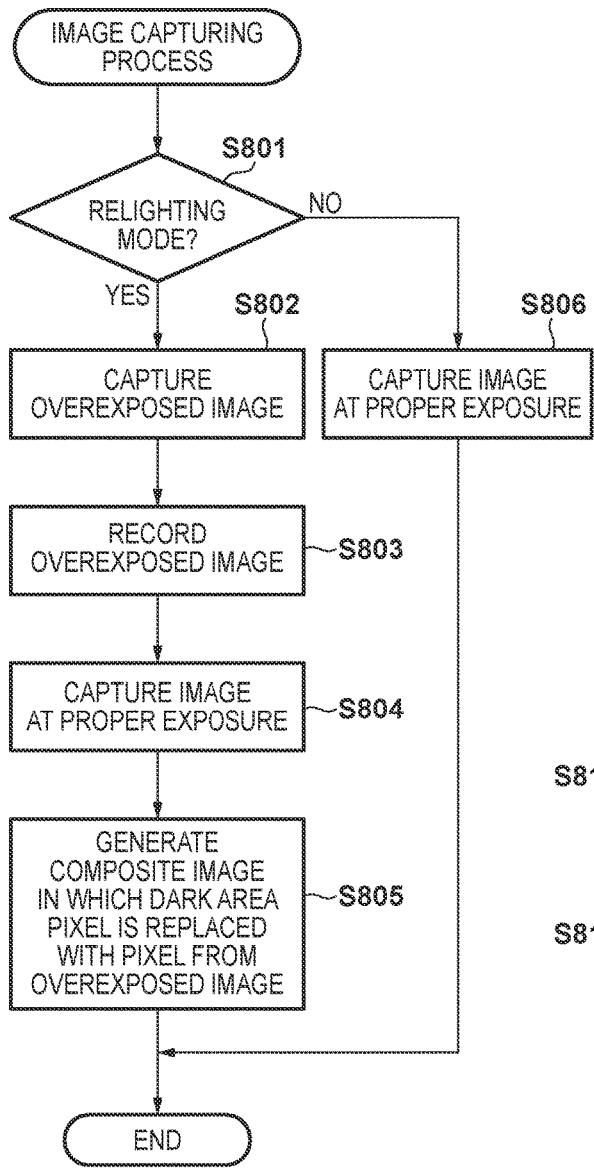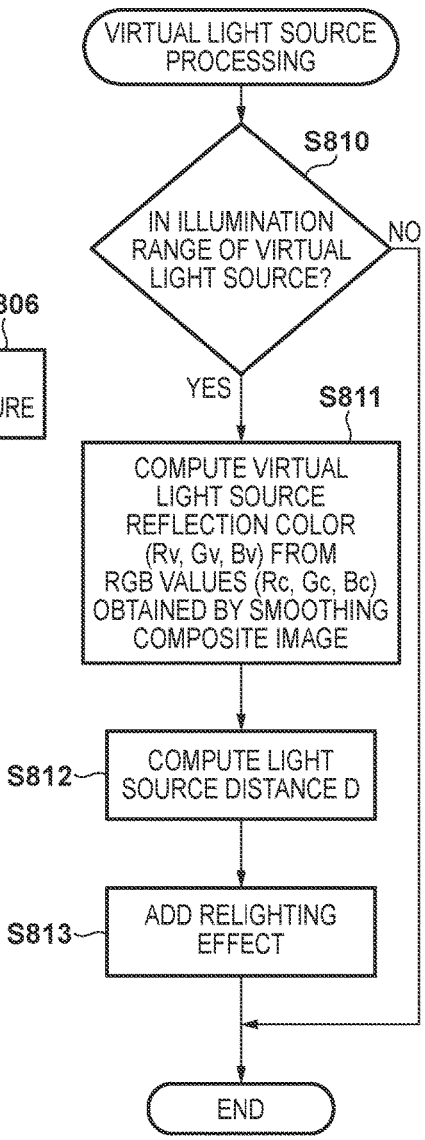

IMAGE PROCESSING APPARATUS AND IMAGE PROCESSING METHOD THEREOF

TECHNICAL FIELD

The present invention relates to image processing apparatuses and control methods thereof, and particularly relates to techniques for correcting the brightness of an image.

BACKGROUND ART

A conventional technique for correcting brightness ("relighting") by illuminating a subject in an image with light from a virtual light source is known (Japanese Patent Laid-Open No. 2010-135996). This technique makes it possible to brighten dark areas such as shadows produced by environment light, which enables the image to be corrected so that a subject present in blocked-up shadows, for example, can be recognized.

In the case of relighting on a facial area, for example, an area having a lower luminance than an average luminance of the overall facial area is extracted as a shadow area and the brightness of the shadow area is increased, and as a result shadows in a facial area can be suppressed without affecting the brightness of other areas.

The method disclosed in Japanese Patent Laid-Open No. 2010-135996 raises the brightness of the shadow area by increasing the gain. However, increasing the gain amplifies noise components in addition to signal components, which causes a drop in the S/N ratio of the corrected area. Japanese Patent Laid-Open No. 2010-135996 does apply a noise reduction filter in order to suppress a drop in the S/N ratio, but the noise reduction process is the application of smoothing, which can cause a loss of details in the image.

SUMMARY OF INVENTION

Having been achieved in light of such problems with conventional techniques, the present invention provides an image processing apparatus, and a control method thereof, capable of correcting a brightness of a pixel while suppressing noise amplification and a loss of subject details.

According to one aspect of the present invention, there is provided an image processing apparatus that corrects a brightness of a pixel in an image, the apparatus comprising: estimating means for estimating reflection characteristics of environment light when the image was captured; computing means for computing a correction value that corrects the brightness of the pixel based on the reflection characteristics of the environment light; and correcting means for correcting the brightness of the pixel by adding the correction value to the pixel, wherein the estimating means estimates the reflection characteristics of the environment light by applying smoothing to the image.

According to another aspect of the present invention, there is provided an image capturing apparatus comprising: the image processing apparatus according to the present invention; and capturing means for capturing the image.

According to still another aspect of the present invention, there is provided an image processing apparatus comprising: computing means for computing a correction value for correcting a brightness of a first area in a target image; determining means for determining a second area in the target image that is referred to by the computing means when computing the correction value; and correcting means for correcting the brightness of the first area, wherein the determining means determines the second area based on color information of the first area; the computing means computes, based on the color information of the second area, a plurality of correction values for respective color signals of a plurality of colors within the first area; and the correcting means corrects the brightness of the first area by correcting the respective color signals of the plurality of colors within the first area based on the plurality of correction values computed by the computing means.

According to yet another aspect of the present invention, there is provided an image processing apparatus comprising: correcting means for correcting the brightness of a first area in a target image; and determining means for determining a second area, in the target image, that is referred to when the correcting means corrects the brightness of the first area, wherein the correcting means causes color information of the first area to approach color information of the second area when correcting the brightness of the first area.

According to still yet another aspect of the present invention, there is provided an image processing method of correcting a brightness of a pixel in an image, the method comprising: an estimating step of estimating reflection characteristics of environment light when the image was captured; a computing step of computing a correction value that corrects the brightness of the pixel based on the reflection characteristics of the environment light; and a correcting step of correcting the brightness of the pixel by adding the correction value to the pixel, wherein the estimating step estimates the reflection characteristics of the environment light by applying smoothing to the image.

According to yet still another aspect of the present invention, there is provided an image processing method comprising: a computing step of computing a correction value for correcting a brightness of a first area in a target image; a determining step of determining a second area in the target image that is referred to in the computing step when computing the correction value; and a correcting step of correcting the brightness of the first area, wherein the determining step determines the second area based on color information of the first area; the computing step computes, based on the color information of the second area, a plurality of correction values for respective color signals of a plurality of colors within the first area; and the correcting step corrects the brightness of the first area by correcting the respective color signals of the plurality of colors within the first area based on the plurality of correction values computed in the computing step.

According to still yet another aspect of the present invention, there is provided an image processing method comprising: a correcting step of correcting the brightness of a first area in a target image; and a determining step of determining a second area, in the target image, that is referred to when the correcting step corrects the brightness of the first area, wherein the correcting step causes color information of the first area to approach color information of the second area when correcting the brightness of the first area.

Further features of the present invention will become apparent from the following description of exemplary embodiments (with reference to the attached drawings).

BRIEF DESCRIPTION OF DRAWINGS

FIG. 2 is a block diagram illustrating the configuration of an image processing unit according to the present invention.

FIG. 3 is a flowchart illustrating processing performed by a light source characteristic extraction unit according to a first embodiment of the present invention.

FIGS. 8A and 8B are flowcharts illustrating a process for adding a virtual light source according to a second embodiment of the present invention.

DESCRIPTION OF EMBODIMENTS

Exemplary embodiments of the present invention will now be described in detail in accordance with the accompanying drawings. Note that the following embodiments describe an example in which a digital camera is applied as an image processing apparatus according to the present invention. Note that "digital camera" refers to an electronic device having an image capturing function that uses a photoelectric conversion device, and thus includes any electronic device having a camera (or that can use a camera), such as cellular phones, video game devices, and personal computers. However, an image capturing function is not a requirement for the present invention, and the image processing apparatus according to the present invention can be applied in any electronic device capable of processing images.

First Embodiment

Figure 1:
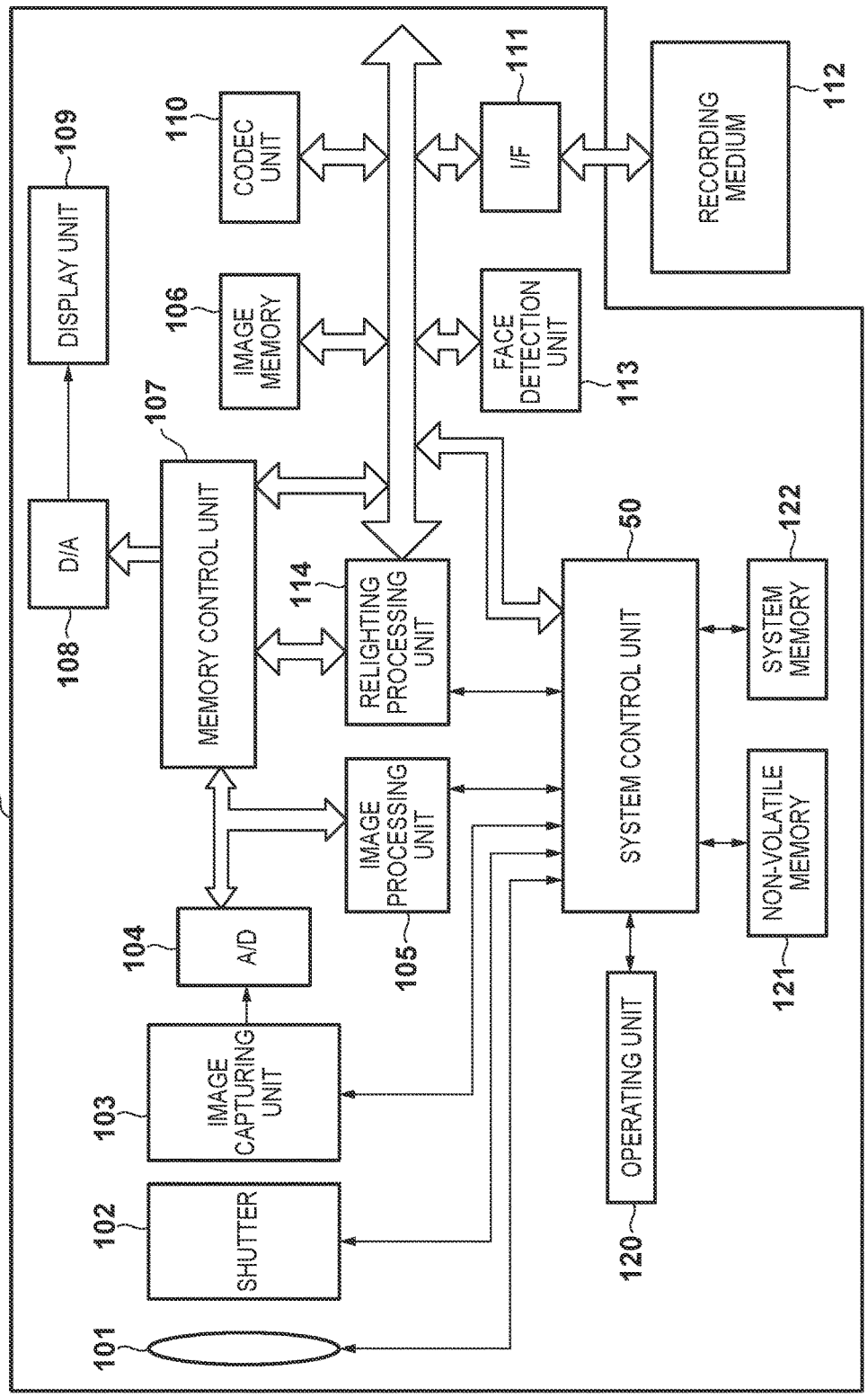
FIG. 1 is a block diagram illustrating the configuration of a digital camera according to the present invention.

FIG. 1 is a block diagram illustrating an example of the configuration of a digital camera 100 according to a first embodiment of the present invention.

In FIG. 1, a lens group 101 corresponds to a zoom lens including a focus lens. A shutter 102 having an aperture function is provided between the lens group 101 and an image capturing unit 103. The image capturing unit 103 has an image sensor such as a CCD/CMOS image sensor, which converts an optical image formed by the lens group 101 on an image plane into electrical signals on a pixel-by-pixel basis. An A/D converter 104 converts an analog signal output by the image capturing unit 103 into a digital signal (image data).

An image processing unit 105 carries out various types of image processing on the image data output from the A/D converter 104, such as color interpolation (demosaicing), white balance adjustment, γ correction, edge enhancement, noise reduction, color correction, and the like. An image memory 106 temporarily stores image data. A memory control unit 107 controls reading/writing of the image memory 106. A D/A converter 108 converts the image data into an analog signal. A display unit 109 has a display device such as an LCD, an organic EL display, or the like, and displays various types of GUIs, live view images, images read out from a recording medium 112 and played back, and so on. A codec unit 110 encodes image data stored in the image memory 106 using a predetermined method for recording the data into the recording medium, decodes encoded image data contained in an image file to display the data, for example, and so on.

An interface (I/F) 111 mechanically and electrically connects the recording medium 112, which is a removable medium such as a semiconductor memory card, a card-type hard disk, or the like, to the digital camera 100. A system control unit 50 may be a programmable processor such as a CPU, an MPU, or the like, for example. The system control unit 50 implements functions of the digital camera 100 by executing programs recorded in, for example, a non-volatile memory 121 or an internal non-volatile memory and controlling blocks, circuits, and so on required thereby. A relighting processing unit 114 carries out a relighting process on a captured image.

An operating unit 120 is a unit that consolidates buttons, switches, and so on through which a user inputs various types of instructions to the digital camera 100.

The non-volatile memory 121 is a memory that can be recorded to and erased electrically, and may be, for example, an EEPROM or the like. The non-volatile memory 121 stores various types of configuration values, GUI data, and in the case where the system control unit 50 is an MPU, a CPU, or the like, programs to be executed by the system control unit 50.

A system memory 122 is used for loading operational constants and variables of the system control unit 50, programs read out from the non-volatile memory 121, and the like.

Next, operations performed by the digital camera 100 when capturing an image will be described.

For example, the image capturing unit 103 uses the image sensor to photoelectrically convert a subject image formed on the image plane by the lens group 101 when the shutter 102 is open, and the converted image is output to the A/D converter 104 as an analog image signal. The A/D converter 104 converts the analog image signal output from the image capturing unit 103 into a digital image signal (image data) and outputs the digital image signal to the image processing unit 105.

The image processing unit 105 carries out various types of image processing on the image data from the A/D converter 104 or image data from the memory control unit 107, such as color interpolation (demosaicing), γ correction, edge enhancement, noise reduction, color correction, and the like.

Meanwhile, the image processing unit 105 performs predetermined computational processing related to luminance, contrast, and so on using the captured image data, and the system control unit 50 performs focus control and exposure control based on results obtained from these computations. In this manner, the digital camera 100 according to the present embodiment carries out through-the-lens (TTL) autofocus (AF) processing, automatic exposure (AE) processing, and so on. The image processing unit 105 furthermore carries out auto white balance (AWB) adjustment using the captured image data.

The image data output from the image processing unit 105 is written into the image memory 106 via the memory control unit 107. The image memory 106 stores the image data output from the image capturing unit 103, image data for display in the display unit 109, and the like.

Meanwhile, the D/A converter 108 converts data for image display, stored in the image memory 106, into an analog signal and supplies the analog signal to the display unit 109. The display unit 109 carries out a display in the display device, which is an LCD or the like, based on the analog signal from the D/A converter 108.

The codec unit 110 encodes the image data recorded into the image memory 106 based on a standard such as JPEG, MPEG, or the like. The system control unit 50 forms an image file in which the encoded image data is assigned a predetermined header and the like, and records the file into the recording medium 112 via the interface 111.

Note that in current digital cameras, the display unit 109 generally functions as an electronic viewfinder (EVF) by capturing a moving picture when in a capture standby state and continuously displaying the captured moving picture in the display unit 109. In this case, the shutter 102 is kept open, and capturing is carried out at, for example, 30 frames/second using what is known as an electronic shutter of the image capturing unit 103.

When a shutter button included in the operating unit 120 is then depressed halfway, the aforementioned AF and AE control is carried out; then, when the shutter button is fully depressed, a process for actually capturing the image is carried out in order to capture a still image for recording, and the still image is recorded into the recording medium 112. In the case where an instruction is made to capture a moving picture using a moving picture capture button or the like, the recording of a moving picture into the recording medium 112 begins.

FIG. 2 is a block diagram illustrating an example of the functional configuration of the image processing unit 105.

The image data output from the A/D converter 104 illustrated in FIG. 1 is input into a luminance/color signal generation unit 200. The image data has values for each color component in a color filter provided in the image sensor. In the case where a typical Bayer primary color filter array is used, the image data is composed of R pixel, G pixel, and B pixel data.

The luminance/color signal generation unit 200 carries out a demosaicing processing on such image data, generates color signals R, G, and B for each pixel, and furthermore generates a luminance signal Y from the color signals. The luminance/color signal generation unit 200 outputs the generated color signals R, G, and B to a white balance (WB) amplification unit 203, and outputs the luminance signal Y to an edge enhancement processing unit 201.

The edge enhancement processing unit 201 carries out an edge enhancement process on the luminance signal Y and outputs the processed signal to a luminance gamma processing unit 202. The luminance gamma processing unit 202 carries out gamma correction on the luminance signal Y and outputs the corrected luminance signal Y to the image memory 106.

Based on a white balance gain value computed by the system control unit 50 through a process that will be described later, the WB amplification unit 203 adjusts the white balance of the color signals R, G, and B by applying a gain thereto. A color conversion processing unit 204 converts to a desired color balance through matrix processing on the color signals R, G, and B. A color gamma processing unit 205 carries out gamma correction on the color signals R, G, and B. A color difference signal generation unit 206 generates color difference signals R−Y and B−Y from the color signals R, G, and B and outputs the generated signals to the image memory 106.

The luminance signal Y and the color difference signals R−Y and B−Y output to the image memory 106 are encoded by the codec unit 110 and ultimately recorded into the recording medium 112.

The color signals R, G, and B output by the color conversion processing unit 204 are also input into a light source characteristic extraction unit 207. The light source characteristic extraction unit 207 extracts reflection characteristic information of a subject under an environment light source as light source characteristic information and records the light source characteristic information in the system memory 122.

Operations performed by the light source characteristic extraction unit 207 will be described using the flowchart in FIG. 3. The light source characteristics are extracted on a pixel-by-pixel basis.

In S301, the light source characteristic extraction unit 207 generates a luminance (L) signal, a hue (H) signal, and a saturation (S) signal from the color signals R, G, and B of the pixel being processed.

In S302, the light source characteristic extraction unit 207 determines whether the pixel being processed is within a predetermined characteristic area, for example a facial area (401 in FIG. 4A) detected by a face detection unit 113, ends the processing in the case where the pixel is not within the area, and advances the processing to S303 in the case where the pixel is within the area.

Figure 4A:
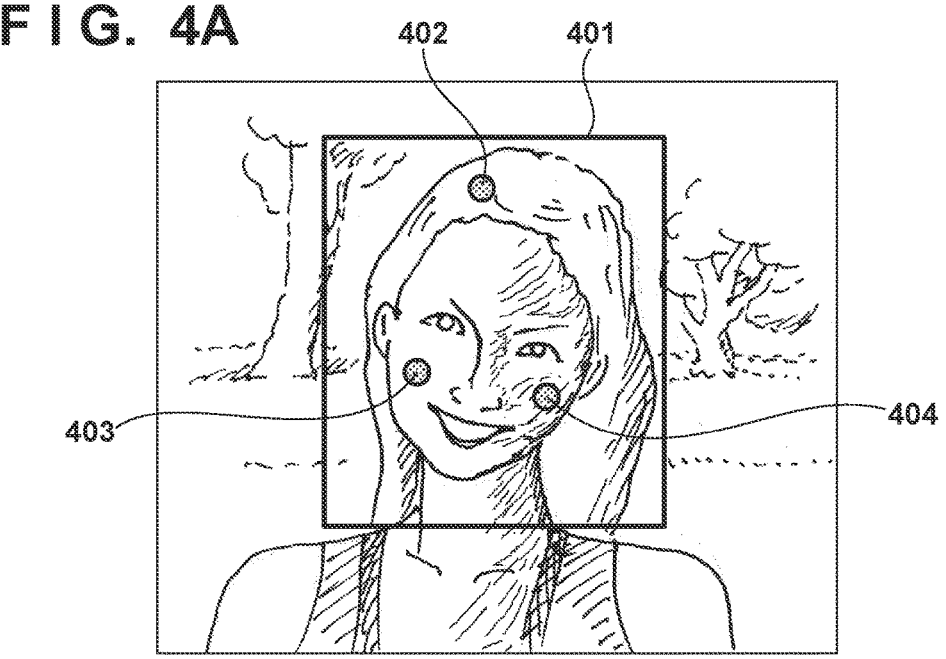
FIGS. 4A and 4B are diagrams illustrating an example of a subject according to an embodiment of the present invention.
Figure 4B:
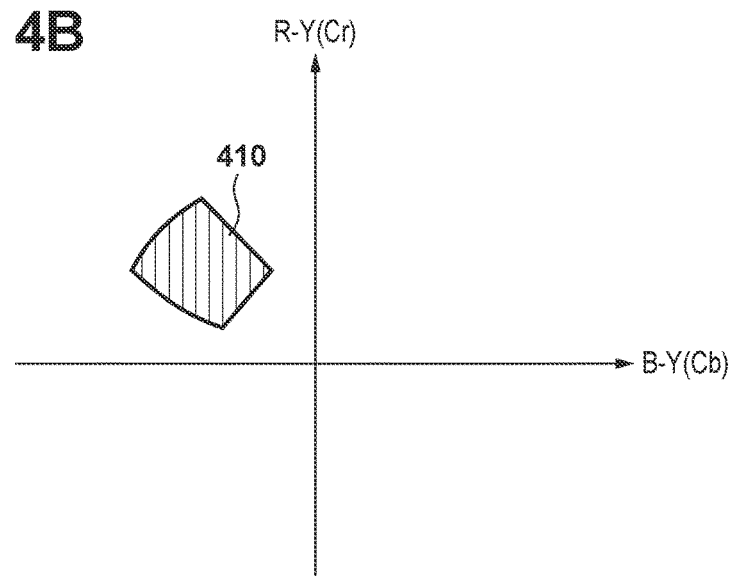

In S303, the light source characteristic extraction unit 207 determines whether or not a color of the pixel being processed matches a particular color. Here, because the predetermined characteristic area is a facial area, it is determined whether or not the pixel is within a color space range that defines a predetermined flesh color range. FIG. 4B illustrates an example of a flesh color area 410 defined by a CrCb (or UV) color space. Note that in the determination made in S303, an HS coordinate system may be used, or another color space coordinate system that can be converted to from the color signals R, G, and B may be used, as indicated in FIG. 4B.

In the case where it is determined in S303 that the color of the pixel being processed is within the predetermined range of the color space, the light source characteristic extraction unit 207 advances the processing to S304, whereas in the case where it is determined that the color is not within the predetermined range, the processing ends for the pixel being processed. In the example of the image illustrated in FIG. 4A, in the case where pixels 403 and 404 that are within the flesh color area 410 have been processed, the light source characteristic extraction unit 207 advances the processing to S304; in the case where a pixel 402 that is not within the flesh color area 410 has been processed, the processing ends.

In S304, the light source characteristic extraction unit 207 determines whether or not a luminance signal value of the pixel being processed matches a predetermined high luminance value based on whether or not the luminance signal value is greater than or equal to a predetermined value. S304 is a process for extracting a subject area on which strong environment light is falling. In the case where, in the example of the image illustrated in FIG. 4A, the pixel 403, which is a high-luminance pixel, is the pixel being processed, the light source characteristic extraction unit 207 advances the processing to S305; in the case where the pixel 404, whose luminance is low due to the influence of shadow or the like, is the pixel being processed, the processing ends.

In S305, the light source characteristic extraction unit 207 integrates, on a color component-by-color component basis, the color signals R, G, and B of the pixel being processed that meets all the conditions of S302 to S304. The integration results are taken as (Rt, Gt, Bt).

In S306, the light source characteristic extraction unit 207 counts up (+1) a number of the integrated pixel. The count number is taken as N.

The foregoing describes the processing of the light source characteristic extraction unit 207. Through this processing, information of a pixel region in a specific area of a subject and having a specific color, and that has a high luminance due to environment light falling thereon, such as 403 in FIG. 4A, can be extracted.

The foregoing has described a case where, for example, pixels in an entire captured image, or in a predetermined part thereof, are sequentially processed. However, the light source characteristic extraction process may be carried out on pixels in a specific subject area, such as the facial area, for example. In this case, the determination of S302 is unnecessary.

Figure 5A:
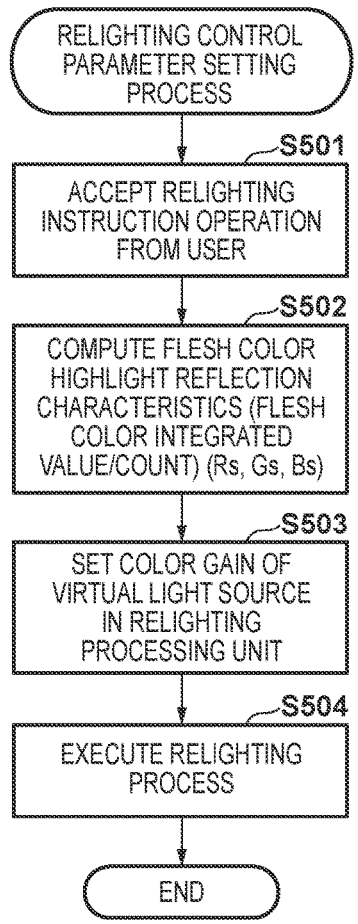
FIGS. 5A and 5B are flowcharts illustrating a process for adding a virtual light source according to the first embodiment of the present invention.

Next, a relighting process carried out on the image output from the image processing unit 105 will be described. In the present embodiment, the relighting process is executed by the relighting processing unit 114, using control parameters computed by the system control unit 50. Accordingly, first, processes for computing and setting the control parameters used in the relighting process will be described using the flowchart illustrated in FIG. 5A.

In S501, the system control unit 50 accepts an instruction to carry out the relighting process from the user through the operating unit 120. Specifically, the system control unit 50 accepts a user operation, made through the operating unit 120, that selects execution of the relighting process through a menu (not shown). In addition to the instruction to execute the relighting process, the system control unit 50 accepts parameters for the relighting process specified through a menu screen, for example.

To simplify the descriptions of the present embodiment, it is assumed that the position of a virtual light source and an intensity ($\alpha$) of the light source are input by the user as the relighting parameters (a method in which parameters are selected from pre-set selections may be used). Assuming that the virtual light source vertically illuminates a subject plane, determining the position of the virtual light source also determines a position where the light of the virtual light source strikes the strongest (a central illumination position).

Figure 7A:
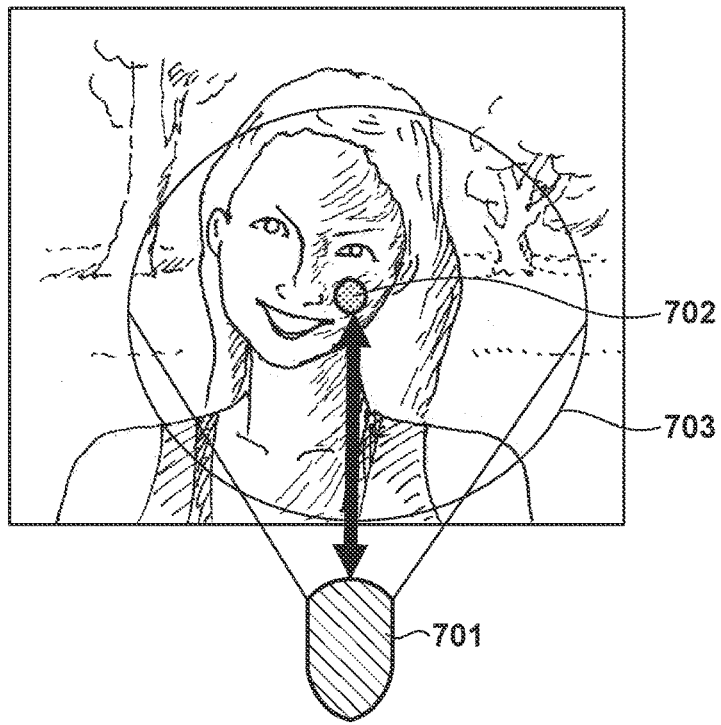
FIGS. 7A and 7B are diagrams illustrating a relationship between a subject and a virtual light source according to the present invention.

FIG. 7A schematically illustrates an example of the virtual light source position and the central illumination position. FIG. 7A illustrates a state in which a virtual light source 701 has an illumination range 703 and a central illumination position 702. It is assumed that the virtual light source affects only the illumination range 703.

Returning to FIG. 5A, in S502, the system control unit 50 computes highlight reflection characteristics (Rs, Gs, Bs) of a particular color. The highlight reflection characteristics of the particular color are an RGB average value of a highlight portion (high-luminance portion), at which the environment light reflected at the time of capturing is reflected by a portion of the subject that has the particular color. In the present embodiment, the light source characteristic extraction unit 207 finds, in the area of the subject, an integrated value (Rt, Gt, Bt) of a pixel that has the flesh color and has a high luminance. This is because diffused reflection components that reflect an object color are dominant in low-luminance areas, whereas highlight (high-luminance) areas contain both diffused reflection components and specular surface reflection components that reflect the environment light source color.

The system control unit 50 divides the integrated value (Rt, Gt, Bt) computed by the light source characteristic extraction unit 207 by the count number N computed in S306, and computes a color (Rs, Gs, Bs) of the highlight portion where the environment light strikes the flesh color area strongly as flesh color highlight reflection characteristics.

In S503, the system control unit 50 generates a gain (coefficient) for converting and expressing the color of the illuminating virtual light source as the color of the environment light during image capturing, and sets the gain in the relighting processing unit 114. Color gains (Rv–Gain, Bv–Gain) of the virtual light source are set as desired by the user, and in the case where the virtual light source and the environment light source are the same color, are as follows:

$Rv$–Gain=1

$Bv$–Gain=1

In S504, the system control unit 50 instructs the relighting processing unit 114 to execute the relighting process.

Next, an example of the configuration of and operations performed by the relighting processing unit 114 will be described.

Figure 6:
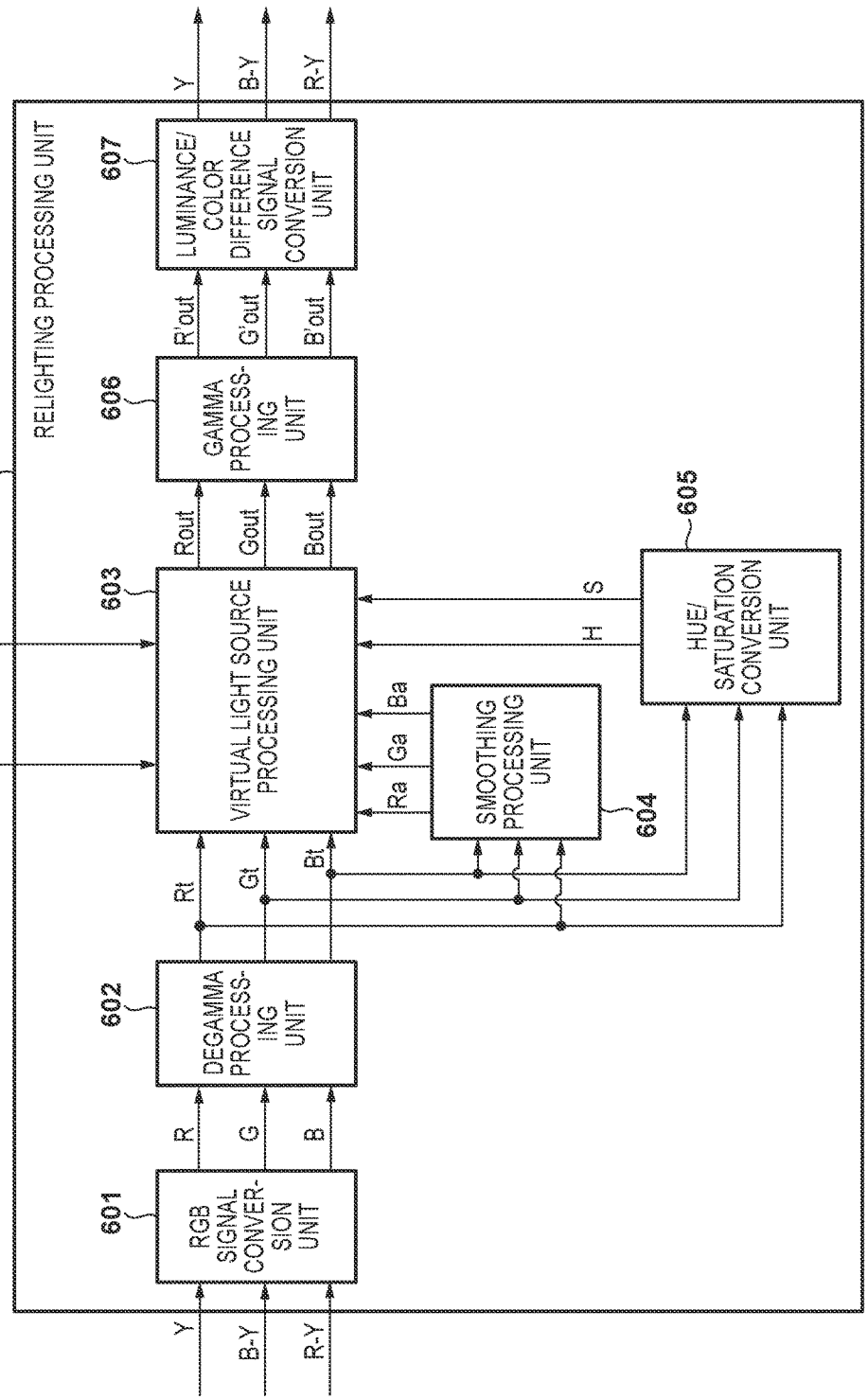
FIG. 6 is a block diagram illustrating the configuration of a relighting processing unit according to the first embodiment of the present invention.

FIG. 6 is a block diagram illustrating the configuration of the relighting processing unit 114.

An RGB signal conversion unit 601 illustrated in FIG. 6 converts the luminance and color difference signals (Y, B–Y, R–Y) input from the image memory 106 into color signals (R, G, B). A degamma processing unit 602 carries out a degamma process (the inverse of the processes performed by the luminance gamma processing unit 202 and the color gamma processing unit 205).

A virtual light source processing unit 603 adds a lighting effect provided by the virtual light source to the image. A smoothing processing unit 604 applies smoothing to the color signals (R, G, B) output by the degamma processing unit 602 and outputs the smoothed signals to the virtual light source processing unit 603. A hue/saturation conversion unit 605 converts the RGB signal output by the degamma processing unit 602 into hue and saturation signals (H, S).

A gamma processing unit 606 carries out gamma correction on the color signals (R, G, and B) output by the virtual light source processing unit 603. A luminance/color difference signal generation unit 607 converts the gamma-corrected color signals (R, G, B) into luminance and color difference signals (Y, B–Y, R–Y) and outputs the signals to the image memory 106.

Next, operations performed by the relighting processing unit 114 will be described.

The relighting processing unit 114 reads out the luminance/color difference signals (Y, B–Y, R–Y) recorded into the image memory 106 and takes those signals as inputs. The RGB signal conversion unit 601 converts the input luminance/color difference signals (Y, B–Y, R–Y) into RGB signals and outputs the signals to the degamma processing unit 602.

The degamma processing unit 602 converts the signals into linear data by carrying out a process having the inverse characteristics as the gamma characteristics applied by the gamma processing unit of the image processing unit 105. The post-linear conversion RGB signals are output to the virtual light source processing unit 603, the smoothing processing unit 604, and the hue/saturation conversion unit 605. Note that the degamma processing unit 602 may be provided in a stage previous to the RGB signal conversion unit 601 and carry out degamma processing. For example, the inverse process from the luminance gamma processing unit 202 may be applied to the Y signal, the inverse process from the color gamma processing unit 205 may be applied to the color difference signals R−Y and B−Y after returning those signals to RGB signals, and the signals may be reconverted into the color difference signals R−Y and B−Y and input into the RGB signal conversion unit 601.

In the smoothing processing unit 604, each color component in the degamma-processed RGB-format color signals (Rt, Gt, Bt) of the pixel being processed is replaced with an average value between that pixel and the color signal values of surrounding pixels. For example, average values of nine pixels in a 3×3 pixel area centered on the pixel being processed are computed for each color component, and are taken as the color component values of the post-smoothing pixel being processed. Note that this method is only one example of smoothing, and any desired method can be used. The color signals (Ra, Ga, Ba) smoothed by the smoothing processing unit 604 are output to the virtual light source processing unit 603. The color signals (Ra, Ga, Ba) obtained by applying smoothing express environment light reflection characteristics in the vicinity of the pixel being processed.

The hue/saturation conversion unit 605 converts the input degamma-processed RGB-format color signals (Rt, Gt, Bt) into hue (H) and saturation (S), and outputs the post-conversion hue (H) and saturation (S) signals to the virtual light source processing unit 603.

Details of the virtual light source process carried out by the virtual light source processing unit 603 will be described using the flowchart of FIG. 5B. The virtual light source process is a process that adds a relighting effect provided by the virtual light source to the input image.

Figure 5B:
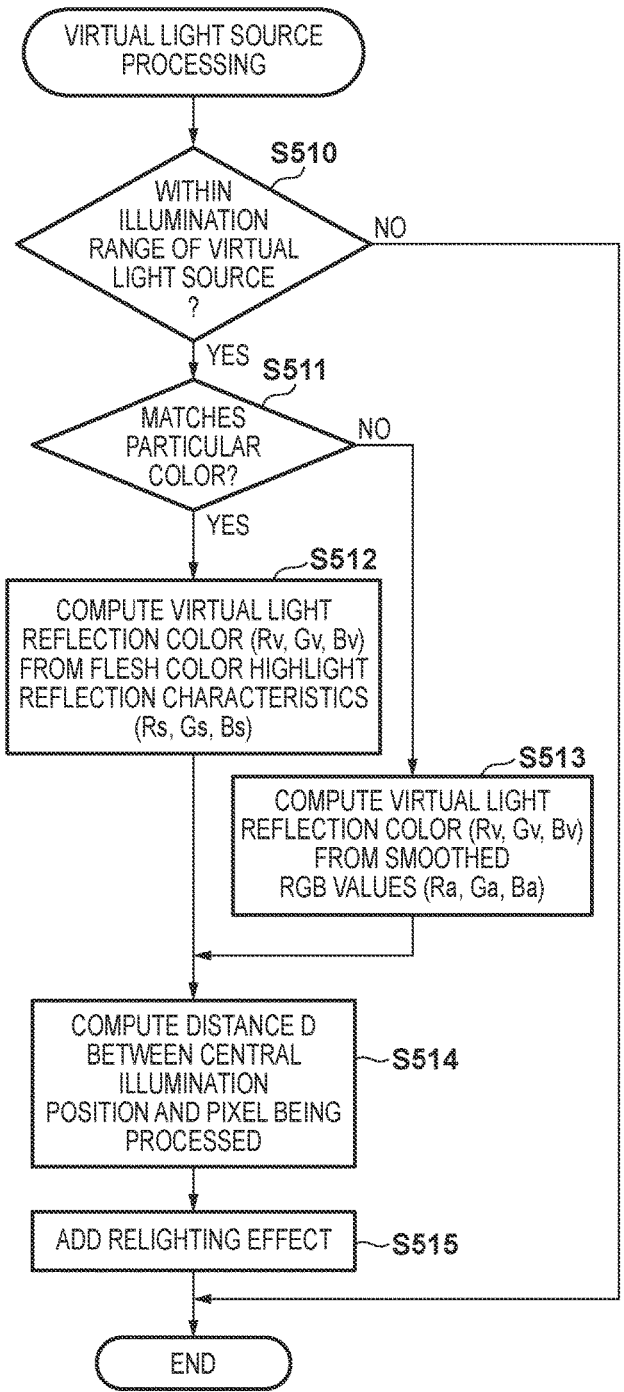

The virtual light source processing unit 603 executes the virtual light source process illustrated in FIG. 5B for each pixel in the input image.

In S510, the virtual light source processing unit 603 determines whether or not the pixel being processed is located within the illumination range of the virtual light source. In the example illustrated in FIG. 7A, the virtual light source processing unit 603 determines whether or not the pixel being processed is located within the illumination range 703 of the virtual light source 701 at the central illumination position 702. This determination can be executed by, for example, taking the positions of the central illumination position 702 and the virtual light source 701 as parameters and using a predetermined function to find the illumination range 703 in the image, and then comparing the range to image coordinates of the pixel being processed. Note that the position of the virtual light source 701 may be fixed or may be variable, and different functions may be used depending on the type of the virtual light source and the like. Furthermore, the way in which light beam spread and so on may be set to be variable by the user.

The virtual light source processing unit 603 advances the processing to S511 in the case where it has been determined that the pixel being processed is located within the illumination range of the virtual light source, and ends the processing without adding the relighting effect in the case where it has been determined that the pixel being processed is not located within the illumination range of the virtual light source.

In S511, the virtual light source processing unit 603 determines whether or not the color of the pixel being processed matches the particular color. Here, it is assumed that the particular color is a human flesh color, and that the virtual light source processing unit 603 determines whether or not the color of the pixel being processed is within an area of a color space corresponding to the flesh color, which is stored in advance. This determination can be carried out by converting the pixel value to a color space coordinate system that defines the particular color.

As described above, in the present embodiment, the flesh color area 410 is defined by a CrCb (or UV) color space as illustrated in FIG. 4B; however, the area may be defined by another color space coordinate system. Here, the determination is carried out using the hue signal (H) and the saturation signal (S), which have the same phase, generated by the hue/saturation conversion unit 605, and thus it is assumed that the virtual light source processing unit 603 determines whether or not the hue and saturation signals of the pixel being processed are within the flesh color area. The virtual light source processing unit 603 advances the processing to S512 in the case where it is determined that the color of the pixel being processed is within the flesh color area (matches the particular color), and advances the processing to S513 in the case where it is determined that the color of the pixel being processed is not within the flesh color area.

In S512 and S513, the virtual light source processing unit 603 determines a color (Rv, Gv, Bv) produced by the pixel being processed reflecting light of the virtual light source (virtual light). This reflection color also exhibits the sensor spectral characteristics and image processing characteristics of the digital camera 100.

In S512, the virtual light source processing unit 603 computes the virtual light reflection color (Rv, Gv, Bv) of the virtual light reflected by the particular color (flesh color) subject. The virtual light reflection color (Rv, Gv, Bv) can be computed by multiplying the flesh color highlight reflection characteristics (Rs, Gs, Bs) computed in S512 by the virtual light source color gains (Rv−Gain, Bv−Gain) set in S502, as follows:

$Rv=Rv-Gain*Rs$ $Gv=Gs$ $Bv=Bv-Gain*Bs$

Meanwhile, in S513, the virtual light source processing unit 603 computes the virtual light reflection color (Rv, Gv, Bv) in which the virtual light is reflected by a subject that is not the particular color. The virtual light reflection color (Rv, Gv, Bv) can be computed by multiplying the color signals (Ra, Ga, Ba) computed by the smoothing processing unit 604 (FIG. 6) by the virtual light source color gains (Rv−Gain, Bv−Gain) set in S502, as follows:

$Rv=Rv-Gain*Ra$ $Gv=Ga$ $Bv=Bv-Gain*Ba$

Figure 7B:
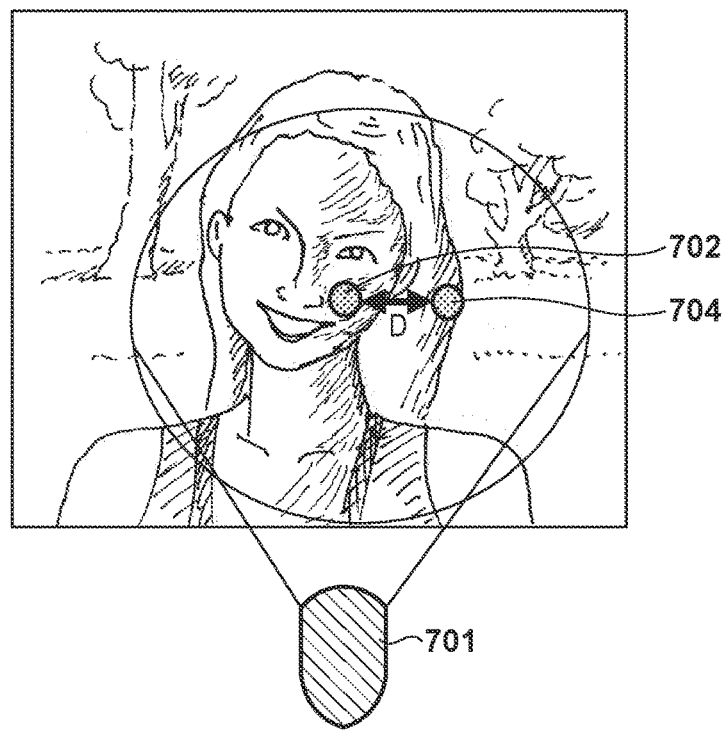

In S514, the virtual light source processing unit 603 computes a distance D between the pixel being processed and the virtual light source. In the present embodiment, as illustrated in FIG. 7B, the distance between the central illumination position 702 of the virtual light source 701 and the pixel being processed 704 is computed as the distance D, which may be a value that uses the pitch between pixels as a unit, for example.

In S515, the virtual light source processing unit 603 adds the relighting effect to the pixel being processed. Specifically, the virtual light reflection color (Rv, Gv, Bv) computed in S512 or S513 is added to the pixel being processed (Rt, Gt, Bt) at a weight based on the virtual light source illumination gain (α) and the distance D computed in S514.

In the present embodiment, each component of the pixel being processed (Rout, Gout, Bout) illuminated by the virtual light source is computed through the following formulae.

$$Rout = Rt + \alpha \times (1/D^2) \times Rv$$

$$Gout = Gt + \alpha \times (1/D^2) \times Gv$$

$$Bout = Bt + \alpha \times (1/D^2) \times Bv$$

Here, the virtual light source illumination gain is $0 < \alpha < 1$.

The relighting effect can be added by carrying out the aforementioned processing on each pixel.

Returning to FIG. 6, the pixel being processed (Rout, Gout, Bout) output from the virtual light source processing unit 603 is input into the gamma processing unit 606. The gamma processing unit 606 applies gamma correction to the pixel being processed (Rout, Gout, Bout) and outputs pixels (R'out, G'out, B'out) having corrected values. The luminance/color difference signal generation unit 607 generates a luminance signal (Y) and color difference signals (R−Y, B−Y) from the pixel being processed (R'out, G'out, B'out) and outputs the generated signals.

The system control unit 50 accumulates the luminance and color difference signals output by the relighting processing unit 114 in the image memory 106 under the control of the memory control unit 107, and then compresses/encodes the signals using the codec unit 110. The system control unit 50 then converts the compressed/encoded image data into a predetermined file format and records the file in the recording medium 112 via the I/F 111.

As described above, in the present embodiment, the reflection characteristics (reflection color) of actual environment light are estimated by applying smoothing to a plurality of pixels present in the vicinity, in the image space or the color space, of the pixel being processed. The virtual light reflection color (Rv, Gv, Bv) is then estimated based on the estimated environment light reflection characteristics (reflection color). The relighting effect is then added by adding the estimated virtual light reflection color (Rv, Gv, Bv) to the pixel being processed (Rt, Gt, Bt) as a brightness correction value. Accordingly, the relighting effect can be added while suppressing an increase in a noise component, as compared to a case where the value of the pixel being processed (Rt, Gt, Bt) is amplified by applying a gain thereto.

With respect to an area of color where it is particularly undesirable for the hue to change due to the relighting effect, the adding is carried out based on the reflection characteristics (Rs, Gs, Bs) of the highlight portion of that color. Accordingly, when the virtual light source is given the same color as the environment light source, an effect in which the illumination of the environment light is added to can be achieved, and the hue of the relighted area can be suppressed from changing.

Normally, dark areas such as shadows have a different hue than highlight areas due to dark area characteristics of the image sensor. In the case where the relighting effect is added into order to brighten such a dark area, simple amplification of the dark area by applying a positive gain to the pixel values thereof will produce a difference in hue between areas brightened by the relighting effect and areas that are originally bright, which are areas originally intended to be the same color. However, in the present embodiment, in the case where a pixel of a given color is to be brightened, the pixel values are added using the reflection characteristics obtained from highlight areas having the same color, which makes it possible to increase the brightness while maintaining the same hue.

Although the present embodiment describes extracting a flesh color highlight portion and predicting the reflection color of the virtual light source based on the extracted flesh color, the extracted area is not limited to a flesh color portion. Any area may be used as long as the configuration predicts the reflection of the virtual light based on an area on which the environment light falls in a different manner. For example, a color aside from the flesh color may be added as a condition. The configuration may be such that a black area for a person's hair or the like is added in addition to the flesh color.

Although the present embodiment describes a case in which flesh color is a characteristic color in order to facilitate understanding of the invention, any desired characteristic color of the subject can be used. The characteristic color may be a color that is present in a high percentage of the subject, or may be a color based on the type of the subject. The configuration may be such that the user specifies the characteristic color. The environment light reflection characteristics can be found for any given characteristic color. Furthermore, the characteristic color is not limited to a single color, and the aforementioned processing may be carried out having found the environment light reflection characteristics for each of a plurality of characteristic colors.

The reflection color of the virtual light estimated from a highlight portion of the same color is more accurate when estimated from an area related to the pixel being processed to which the relighting process is applied. Accordingly, a configuration can be employed where when the pixel being processed is flesh color, for example, a value estimated from a highlight portion within a flesh color area in the vicinity of the pixel being processed or to which the pixel being processed belongs, a highlight portion of the same color present in the same subject area, or the like is used. As such, the configuration may be such that, in the case where a plurality of individual particular color areas are present in the image, the virtual light reflection color is estimated based on the highlight portions of each area and then held, and the virtual light reflection color to be used is then selected based on the coordinates of the pixel being processed. In this case, the nearest computed value can be used, or a value computed within the same subject area can be used.

Note that this assumes a relighting effect that brightens the pixel, and thus the virtual light source illumination gain a is described as a positive value; however, a relighting effect that darkens the pixel may be added as well. In this case, the light source characteristic extraction unit 207 extracts the reflection characteristics from a dark area rather than from a portion of high reflection, and sets the virtual light source illumination gain a to a negative value.

In addition, although the present embodiment describes all pixels within a circular area centered on the central illumination position as being subjected to the effect of the virtual light source to facilitate the descriptions and understanding of the invention, the configuration may be such that only pixels meeting a specific condition are subjected to the effect of the virtual light source. For example, the face detection unit 113 may extract a facial area of a person and of the illumination range 703, only the facial area may be subjected to the effect of the virtual light source. Alternatively, distance information of the subject, such as a defocus amount, measured by the digital camera 100 may be used, and of the illumination range 703, only pixels corresponding to a subject present within a predetermined distance may be subjected to the effect of the virtual light source.

In addition, the distance D used to weight the added value is not limited to a distance from the central illumination position to the addition target pixel in the image as described in the present embodiment, and another desired distance may be used. For example, three-dimensional positions of the digital camera and the subject may be obtained and a three-dimensional distance between the two may be computed.

Finally, although an example in which the effect of the virtual light source is added at a weight in inverse proportion to the square of the distance D, the relationship between the distance D and the weight is not limited thereto. For example, the weight may be inversely proportional to the distance D, the weight may change according to a Gaussian distribution, or the like.

Second Embodiment

Next, a second embodiment of the present invention will be described. While the first embodiment describes estimating the virtual light reflection color from a single captured image, the second embodiment describes estimation using a plurality of captured images. As such, only the internal configuration of the relighting processing unit 114 and operations performed by the system control unit 50, which are different from those in the first embodiment, will be described hereinafter.

FIG. 8A is a flowchart illustrating operations performed by the system control unit 50 when capturing an image, according to the present embodiment. In S801 of FIG. 8A, the system control unit 50 determines a capturing mode. It is assumed that the user can switch the capturing mode between a capturing mode that applies relighting and a normal capturing mode by operating the operating unit 120. The system control unit 50 advances the processing to S802 in the case where the capturing mode that applies relighting is set, and to S806 in the case where another capturing mode (the normal mode, here) is set. In S806, the system control unit 50 captures a single image through the normal mode (i.e., capture an image at a proper exposure) and ends the processing.

In S802, the system control unit 50 first captures an overexposed image. For example, a shadowed area of the subject, such as the pixel 404 in FIG. 4A, is captured at high-exposure conditions so that that pixel 404 is at a proper exposure. There is thus the possibility that a brighter area 403 will be saturated (blooming).

In S803, the system control unit 50 records the captured overexposed image into the image memory 106.

In S804, the system control unit 50 captures an image at a proper exposure. "Proper exposure" refers to an exposure at which a primary subject (in the example of FIG. 4A, the bright area 403 in the face of the subject) is at an appropriate brightness. Note that the processing of S802 to S804 may be carried out from properly-exposed capturing. Two images are captured over a short period of time, in a burst, so that the subject does not move, the subject brightness does not change significantly, and so on, as is normally taken into consideration when generating an HDR composite image.

In S805, the system control unit 50 generates what is known as an HDR composite image by sequentially supplying two captured images having different exposures to the image processing unit 105. This composite image corresponds to information expressing the environment light reflection characteristics. The functional configuration and basic processing operations of the image processing unit 105 are the same as in the first embodiment, and thus redundant descriptions thereof will be omitted, with descriptions focusing on processing operations performed by the light source characteristic extraction unit 207, which are a characteristic of the present embodiment.

For example, the system control unit 50 supplies the second captured image to the image processing unit 105 without recording that images into the system memory 122, and then supplies the first captured image recorded into the system memory 122 to the image processing unit 105. In the relighting mode, the light source characteristic extraction unit 207 generates a single composite image by combining the plurality of images that are supplied thereto.

Specifically, the light source characteristic extraction unit 207 generates the single composite image by replacing the pixels in the image captured at overexposure in a dark area of the image captured at the proper exposure, such as the area in which the pixel 404 illustrated in FIG. 4A is present. At this time, if the pixel used in the replacement is overexposed, that pixel is converted to a brightness that corresponds to the proper exposure. The composite image obtained in this manner is an image having few dark areas produced by shadows. The image processing unit 105 records the composite image into the image memory 106.

Note that in S802-S804, a plurality of images may be captured while changing the degree of overexposure, and properly-exposed pixels may then be used from the plurality of overexposed images when generating the composite image.

Figure 9:
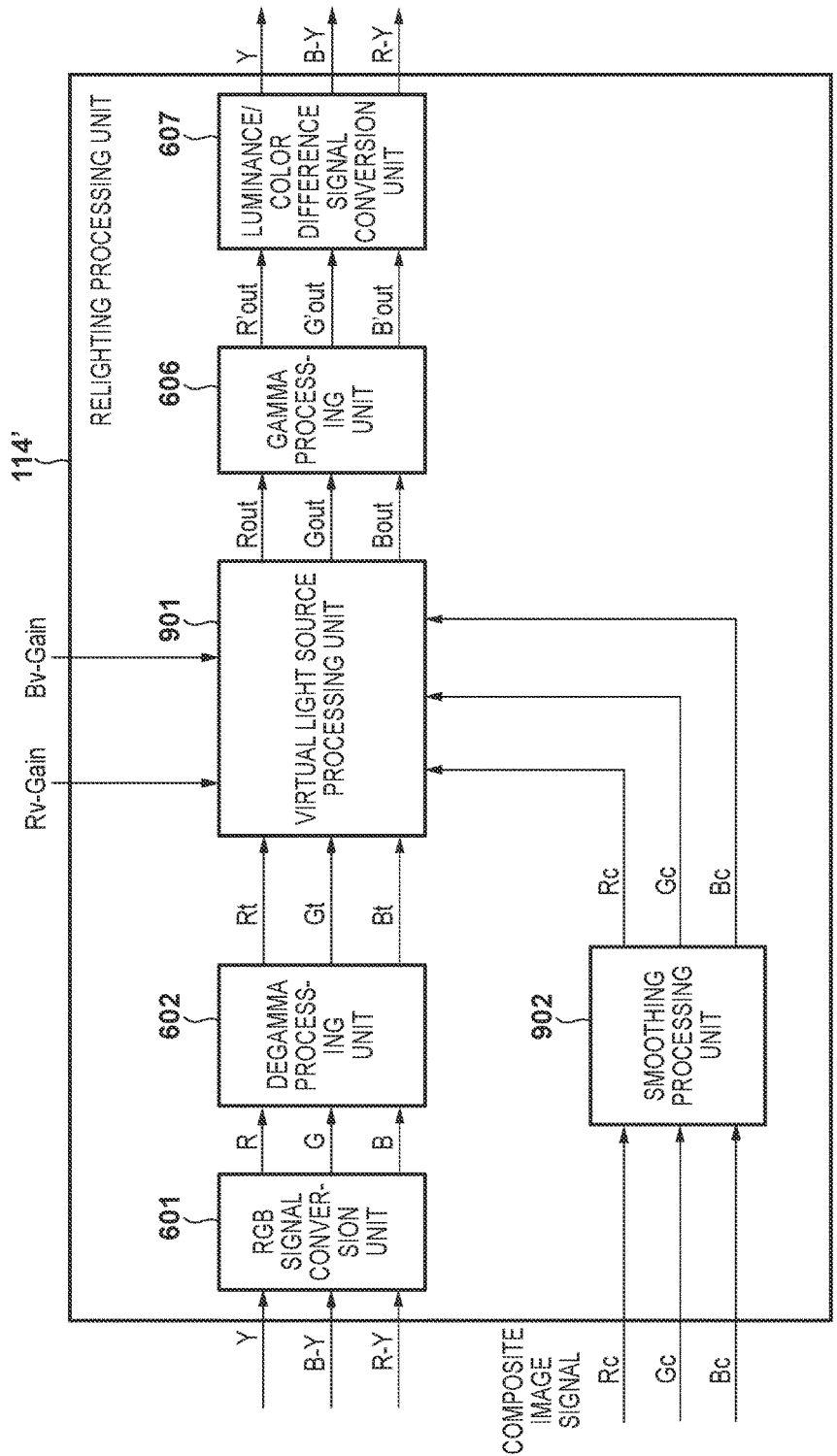
FIG. 9 is a block diagram illustrating the configuration of a relighting processing unit according to the second embodiment of the present invention.

Next, the configuration of and operations performed by a relighting processing unit 114' according to the present embodiment will be described. FIG. 9 is a diagram illustrating an example of the functional configuration of the relighting processing unit 114' according to the present embodiment. Functional blocks that are the same as in the first embodiment are given the same reference numerals as in FIG. 6, and descriptions thereof will be omitted. Operations performed by the relighting processing unit 114' following the control parameter computation and setting processing described using FIG. 5A will be described next.

In the relighting processing unit 114', the image captured at the proper exposure is input into the RGB signal conversion unit 601 and the composite image generated by the light source characteristic extraction unit 207 is input into a smoothing processing unit 902. Note that the smoothing processing unit 902 applies smoothing in a pixel at the same image coordinates as the pixel being processed that is received from the degamma processing unit 602 and processed by a virtual light source processing unit 901, and outputs the smoothed pixel signal (Rc, Gc, Bc) to the virtual light source processing unit 901. The details of the smoothing are the same as in the first embodiment.

The virtual light source processing unit 901 adds the relighting effect to the captured image signal captured at the proper exposure and input from the degamma processing unit 602. Operations performed by the virtual light source processing unit 901 will be described using the flowchart illustrated in FIG. 8B.

In S810, the virtual light source processing unit 901 determines whether or not the pixel being processed is located within the illumination range of the virtual light source, in the same manner as the process of S510 in the first embodiment. The virtual light source processing unit 901 advances the processing to S811 in the case where it has been determined that the pixel being processed is located within the illumination range of the virtual light source, and ends the processing without adding the relighting effect in the case where it has been determined that the pixel being processed is not located within the illumination range of the virtual light source.

In S811, the virtual light source processing unit 901 computes the virtual light reflection color (Rv, Gv, Bv). The virtual light reflection color (Rv, Gv, Bv) can be computed by multiplying color signals (Rc, Gc, Bc) computed by the smoothing processing unit 902 from the composite image by the virtual light source color gains (Rv−Gain, Bv−Gain) set in S502, as follows:

$$Rv = Rv\text{-Gain} * Rc$$

$$Gv = Gc$$

$$Bv = Bv\text{-Gain} * Bc$$

In S812, the virtual light source processing unit 901 computes the distance D between the virtual light source and the pixel being processed. This may be the same as the process of S514 in the first embodiment.

In S813, the virtual light source processing unit 901 adds the relighting effect to the pixel being processed. Specifically, the virtual light reflection color (Rv, Gv, Bv) computed in S811 is added to the pixel being processed (Rt, Gt, Bt) at a weight based on the virtual light source illumination gain (α) and the distance D computed in S812.

In the present embodiment as well, each component of the pixel being processed (Rout, Gout, Bout) illuminated by the virtual light source is computed through the following formulae.

$$Rout = Rt + \alpha \times (1/D^2) \times Rv$$

$$Gout = Gt + \alpha \times (1/D^2) \times Gv$$

$$Bout = Bt + \alpha \times (1/D^2) \times Bv$$

Here, the virtual light source illumination gain is $0 < \alpha < 1$.

The relighting effect can be added by carrying out the aforementioned processing on each pixel.

The pixel signal to which the relighting effect has been added by the virtual light source processing unit 901 is subjected to gamma processing by the gamma processing unit 606, converted into a luminance/color difference signal by the luminance/color difference signal generation unit 607, and output.

As described thus far, the present embodiment provides a configuration in which the virtual light reflection color (Rv, Gv, Bv) is computed using an image in which pixels of a dark area of a properly-exposed image are composited using pixels of an overexposed image. Accordingly, in the case where the relighting effect is to be added to a pixel in a dark area in the properly-exposed image, the color after the relighting effect has been added can be suppressed from differing from the color of an area that is originally bright, even without using the virtual light reflection color estimated from a highlight portion of the same color.

Furthermore, like the first embodiment, the relighting effect can be added without increasing noise.

Although the present embodiment describes capturing an overexposed image only in the case where the capturing mode that applies relighting is set, the configuration may be such that images are captured at both the proper exposure and overexposure regardless of the capturing mode and recorded into the recording medium.

Note that for an image subject to the relighting process, it may be found whether there is an image captured at overexposure, and the method of the second embodiment may be used in the case where such an image is present, while the method of the first embodiment may be executed in the case where such an image is not present. In this case, both methods can be carried out dynamically by implementing the relighting processing unit 114 as software, for example, or by using a programmable logic array capable of being dynamically reconfigured. Of course, the relighting processing units 114 and 114' may be provided individually.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125755, filed on Jun. 18, 2014, which is hereby incorporated by reference herein in its entirety.

The invention claimed is:

1. An image processing apparatus that corrects a brightness of a pixel in an image, the apparatus comprising:
   a processor;
   a memory that stores a program executable by the processor, wherein the program, when executed by the processor, causes the processor to function as units comprising:
   (1) an estimating unit configured to estimate reflection characteristics of environment light when the image was captured;
   (2) a computing unit configured to compute a correction value that corrects the brightness of the pixel based on the reflection characteristics of the environment light; and
   (3) a correcting unit configured to correct the brightness of the pixel by adding the correction value to the pixel, wherein the estimating unit estimates the reflection characteristics of the environment light by applying smoothing to the image.

2. The image processing apparatus according to claim 1, wherein the estimating unit estimates the reflection characteristics of the environment light by applying smoothing to a plurality of pixels present around the pixel.

3. The image processing apparatus according to claim 1, wherein the estimating unit estimates the reflection characteristics of the environment light by applying smoothing to a plurality of pixels present in the same characteristic area as the pixel.

4. The image processing apparatus according to claim 1, wherein in the case where a color of the pixel is within an area of a particular color predetermined by a color space, the estimating unit estimates the reflection characteristics of the environment light by applying smoothing to a plurality of pixels, of pixels in the image, that have a color included in the area of the particular color.

5. The image processing apparatus according to claim 4, wherein in the case where the color of the pixel is within the area of the particular color, the estimating unit estimates the reflection characteristics of the environment light by applying smoothing to a plurality of pixels, of pixels in the image, that have a color included in the area of the particular color and that have a brightness greater than or equal to a predetermined brightness.

6. The image processing apparatus according to claim 1, wherein the estimating unit estimates the reflection characteristics of the environment light using a composite image in which a pixel, of the pixels in the image, that has a brightness less than or equal to a predetermined brightness is replaced with a corresponding pixel in an image captured at overexposure relative to the image.

7. The image processing apparatus according to claim 1, wherein the reflection characteristics of the environment light express a color of reflected light of the environment light.

8. The image processing apparatus according to claim 1, wherein the estimating unit applies smoothing for each of color components of the image; and
wherein the correcting unit computes the correction value for each of the color components.

9. An image processing apparatus comprising:
a processor;
a memory that stores a program executable by the processor, wherein the program, when executed by the processor, causes the processor to function as units comprising:
(1) a computing unit configured to compute a correction value for correcting a brightness of a first area in a target image;
(2) a determining unit configured to determine a second area in the target image that is referred to by the computing unit when computing the correction value; and
(3) a correcting unit configured to correct the brightness of the first area,
wherein the determining unit determines the second area based on color information of the first area;
wherein the computing unit computes, based on the color information of the second area, a plurality of correction values for respective color signals of a plurality of colors within the first area; and
wherein the correcting unit corrects the brightness of the first area by correcting the respective color signals of the plurality of colors within the first area based on the plurality of correction values computed by the computing unit.

10. The image processing apparatus according to claim 9, wherein the correcting unit corrects the brightness of the first area by adding the plurality of correction values computed by the computing unit to the respective color signals of the plurality of colors within the first area.

11. The image processing apparatus according to claim 9, wherein the program, when executed by the processor, further causes the processor to function as:
a setting unit for setting, in the target image, a correction target region that is to be corrected by the correcting unit,
wherein the first area is within the correction target region, and
wherein the computing unit computes the plurality of correction values based on a difference between a center position of the correction target region set by the setting unit and a center position of the first area.

12. The image processing apparatus according to claim 11, wherein the correcting unit corrects the brightness of the correction target region so that a subject present in the target image is illuminated by light from a virtual light source.

13. The image processing apparatus according to claim 12, wherein the computing unit computes the plurality of correction values based on a color temperature of the light from the virtual light source.

14. The image processing apparatus according to claim 9, wherein the computing unit averages color signals within the second area for respective colors and computes the plurality of correction values based on the respective averaged color signals.

15. The image processing apparatus according to claim 9, wherein in the case where the first area is present in an area of a particular color, the determining unit determines the second area from among the area of the particular color.

16. The image processing apparatus according to claim 15, wherein in the case where the first area is present in the area of the particular color, the determining unit determines an area, among the area of the particular color, whose luminance value is greater than or equal to a predetermined value as the second area.

17. The image processing apparatus according to claim 16, wherein in the case where the first area is not present in the area of the particular color, the determining unit determines an area around the first area as the second area.

18. An image processing method comprising:
computing a correction value for correcting a brightness of a first area in a target image;
determining a second area in the target image that is referred to in the computing step when computing the correction value; and
correcting the brightness of the first area,
wherein the determining step determines the second area is determined based on color information of the first area,
wherein a plurality of correction values is computed for respective color signals of a plurality of colors within the first area based on the color information of the second area, and
wherein the brightness of the first area is corrected by correcting the respective color signals of the plurality of colors within the first area based on the plurality of correction values computed in the computing.

* * * * *